(12) United States Patent
Kuroda et al.

(10) Patent No.: US 9,061,711 B2
(45) Date of Patent: Jun. 23, 2015

(54) HOOD STRUCTURE FOR UNEVEN TERRAIN TRAVELING VEHICLE

(71) Applicant: Honda Motor Co., Ltd., Tokyo (JP)

(72) Inventors: Kosuke Kuroda, Wako (JP); Hajime Uchiyama, Wako (JP); Jun Tomiyama, Wako (JP); Erik Dunshee, Torrance, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/042,049

(22) Filed: Sep. 30, 2013

(65) Prior Publication Data

US 2015/0091326 A1 Apr. 2, 2015

(51) Int. Cl.
*B62D 25/10* (2006.01)
*B62D 25/14* (2006.01)

(52) U.S. Cl.
CPC .............. *B62D 25/142* (2013.01); *B62D 25/10* (2013.01)

(58) Field of Classification Search
CPC ...... B62D 25/12; B62D 35/00; B62D 35/005; B62D 37/02; B62D 37/02; B62D 25/01
USPC .............. 296/193.11, 180.1; 180/89.17, 69.2, 180/69.24; D12/87, 91
See application file for complete search history.

(56) References Cited

U.S. PATENT DOCUMENTS

| 6,460,916 | B2 | 10/2002 | Mizuta |
| D631,395 | S * | 1/2011 | Tandrup et al. ................ D12/14 |
| 7,950,486 | B2 * | 5/2011 | Van Bronkhorst et al. .......................... 180/89.11 |
| D640,171 | S * | 6/2011 | Danisi ............................ D12/87 |
| D641,288 | S * | 7/2011 | Sun ................... D12/87 |
| 8,225,894 | B2 * | 7/2012 | Mizuta ........................ 180/69.21 |
| 8,303,029 | B2 * | 11/2012 | Mizuta ..................... 296/193.09 |
| 8,430,195 | B2 * | 4/2013 | Jansen et al. .................. 180/69.2 |
| D701,469 | S * | 3/2014 | Lai et al. ......................... D12/87 |
| D703,102 | S * | 4/2014 | Eck et al. ....................... D12/87 |
| D712,311 | S * | 9/2014 | Morgan et al. ................. D12/87 |
| 2001/0007396 | A1 * | 7/2001 | Mizuta ......................... 296/183 |
| 2009/0084619 | A1 * | 4/2009 | Lin .............................. 180/69.2 |
| 2009/0236876 | A1 * | 9/2009 | Sawai et al. ............... 296/193.11 |
| 2011/0108343 | A1 * | 5/2011 | Mizuta ......................... 180/69.2 |
| 2011/0298189 | A1 * | 12/2011 | Schneider et al. ........... 280/80.1 |

* cited by examiner

*Primary Examiner* — Gregory Blankenship
(74) *Attorney, Agent, or Firm* — Westerman, Hattori, Daniels & Adrian, LLP (57) ABSTRACT

A hood covers a front part of a vehicle body from above and extends rearwardly and upwardly from a front end of the vehicle body. The hood includes upper surfaces provided at left and right parts of the hood, guide walls protruding upwardly from the upper surfaces, and a lid defining a lateral central part of the hood and contiguous with the upper ends of the guide walls. The guide walls extend continuously from a front end of the hood to a rear end of the hood. An instrument panel includes an upwardly inclined wall extending rearwardly from the rear end of the hood. The inclined wall slants at an angle larger than an angle at which the hood slants. The inclined wall of the instrument panel has an upper end located higher than an upper end of the hood.

6 Claims, 7 Drawing Sheets

HOOD STRUCTURE FOR UNEVEN TERRAIN TRAVELING VEHICLE

FIELD OF THE INVENTION

The present invention relates to an improvement in an all-terrain vehicle.

BACKGROUND OF THE INVENTION

An all-terrain vehicle adapted to travel on irregular grounds such as wastelands is known from, for example, U.S. Pat. No. 6,460,916. The all-terrain vehicle disclosed in U.S. Pat. No. 6,460,916 has a hood disposed forwardly of a seat extending laterally of the vehicle. The hood slants upwardly and extends rearwardly from a front end of a vehicle body. The hood is located highest in a front part of the vehicle body. The hood includes upper surfaces on lateral left and right sides thereof, left and right guide walls protruding upwardly from the upper surfaces and extending longitudinally of the vehicle, and an elevated surface formed between upper ends of the left and right guide walls.

When the vehicle travels, an airflow passes along the guide walls and then rearwardly from a rear end of the hood, such that the airflow of high pressure is directed toward occupants of the vehicle. As a result, the occupants of such a windshield-less vehicle feel less comfortable.

SUMMARY OF THE INVENTION

It is an object of the present invention is to provide a windshield-less all-terrain vehicle configured to make occupants of the vehicle feel more comfortable by reducing strike of airflow onto the occupant after the airflow passes along a hood of the vehicle.

According to a first aspect of the present invention, there is provided an all-terrain vehicle including a vehicle body frame, left and right front wheels and left and right rear wheels disposed on the vehicle body frame and supporting a vehicle body, a seat disposed between the left and right front wheels and the left and right rear wheels for seating a driver and passengers in lateral juxtaposition, a roll bar extending forwardly of and above the seat, and a hood disposed above the left and right front wheels and forwardly of the seat and covering the vehicle body, wherein the vehicle body includes an instrument panel disposed on a rear end of the hood for supporting meters, and wherein the instrument panel includes an upwardly inclined wall extending rearwardly from the rear end of the hood.

As stated above, the vehicle body includes the instrument panel disposed on the rear end of the hood and supporting the meters. The instrument panel includes the upwardly inclined walls extending rearwardly from the rear end of the hood, such that airflow passing along the upper surfaces of the hood is upwardly directed by the instrument panels. The upwardly directed airflow from the instrument panel is turned downwardly by airflow of high velocity passing near the roll bar extending above the seat. As a result, strike of the airflow onto occupants of the windshield-less all-terrain vehicle is reduced after the airflow passes along the hood, thereby making the occupants feel more comfortable.

Preferably, the hood includes left and right guide walls protruding upwardly from upper surfaces thereof, the left and right guide walls extending continuously formed from a front end of the hood to a rear end of the hood. One of the guide walls has a rear end located on a side of the driver, the rear end of the one guide wall overlapping a steering wheel in a lateral direction of the vehicle when the rear end of the one guide wall is viewed in front elevation. The inclined wall is disposed rearwardly of the rear end of the guide walls. With this arrangement, both an airflow passing between the left and right guide walls and airflows passing outside the guide walls interact reducing their velocities as they are directed toward the driver. As a result, pressures of the airflows hitting the driver can be reduced to thereby make the driver feel more comfortable in the vehicle.

Preferably, the left and right guide walls are spaced from each other by an interval extending laterally of the vehicle, the interval increasing rearwardly of the vehicle. An airflow of high velocity toward a central part of the vehicle is drawn from a narrow front side of the vehicle through the hood between the left and right guide walls and directed rearwardly out of a wide rear area, such that the airflow behind the hood slows down.

Preferably, the hood includes fixed covers disposed above the left and right front wheels, and a lid disposed centrally of the vehicle, the lid being detachable from the vehicle body, the left and right guide walls being each disposed at a boundary between the lid and each of the fixed covers and incorporated in each of the fixed covers. Since the left and right guide walls are part of the fixed covers secured to the vehicle body, it becomes possible to reduce vibration or its noise caused by the left and right guide walls as airflows pass along the guide walls.

Preferably, the vehicle body includes a headrest disposed rearwardly of the driver, and the roll bar includes an upper bar disposed above the headrest. The roll bar is disposed higher than the head of the driver to allow an airflow to smoothly pass through an upper part of the vehicle body at a high velocity different from a velocity of an airflow passing over the hood. The difference in airflow velocity causes the airflow from the hood to turn downwardly.

According to a second aspect of the present invention, there is provided an all-terrain vehicle including a vehicle body frame, left and right front wheels and left and right rear wheels disposed on the vehicle body frame and supporting a vehicle body, a seat disposed between the left and right front wheels and the left and right rear wheels for seating a driver and passengers in lateral juxtaposition, a roll bar extending forwardly of and above the seat, and a hood disposed above the left and right front wheels and forwardly of the seat and covering the vehicle body, wherein the seat being adapted to seat three people laterally of the vehicle in juxtaposition, wherein the vehicle body includes an instrument panel disposed on a rear end of the hood for supporting meters, wherein the instrument panel includes an upwardly inclined wall extending rearwardly from the rear end of the hood, wherein the inclined wall having a lateral center and lateral opposite ends located lower than the lateral center, wherein the hood includes left and right guide walls protruding upwardly from upper surfaces thereof, and wherein the left and right guide walls are spaced from each other by an interval extending laterally of the vehicle, the interval increasing rearwardly of the vehicle.

With the vehicle arranged above, airflows passing along the upper surfaces and left and right guide walls of the hood are directed upwardly by the instrument panel, such that the upwardly directed airflows from the hood are turned downwardly by an airflow of high velocity passing near the roll bar. As a result, the airflow hitting the occupants is reduced. The instrument panel has a central part located high enough to prevent an airflow of high velocity from being directed toward a center of the seat. The instrument panel has left and right parts located low enough to allow the driver to view a front side of the vehicle well.

Preferably, the hood includes fixed covers disposed above the left and right front wheels, and a lid disposed centrally of the vehicle, the lid being detachable from the vehicle body, the left and right guide walls being each disposed at a boundary between the lid and each of the fixed covers and incorporated in each of the fixed covers. Since the left and right guide walls are part of the fixed covers secured to the vehicle body, it becomes possible to reduce vibration or its noise caused by the left and right guide walls as airflows pass the guide walls.

Preferably, the vehicle body includes a headrest disposed rearwardly of the driver, and the roll bar includes an upper bar disposed above the headrest. The roll bar is disposed higher than the head of the driver to allow an airflow to smoothly pass through an upper part of the vehicle body at a high velocity different from a velocity of an airflow passing over the hood. The difference in airflow velocity causes the airflow from the hood to turn downwardly.

BRIEF DESCRIPTION OF THE DRAWINGS

A certain preferred embodiment of the present invention will hereinafter be described in detail, by way of example only, with reference to the accompanying drawings, in which.

DETAILED DESCRIPTION OF THE PREFERRED EMBODIMENTS

Figure 1:
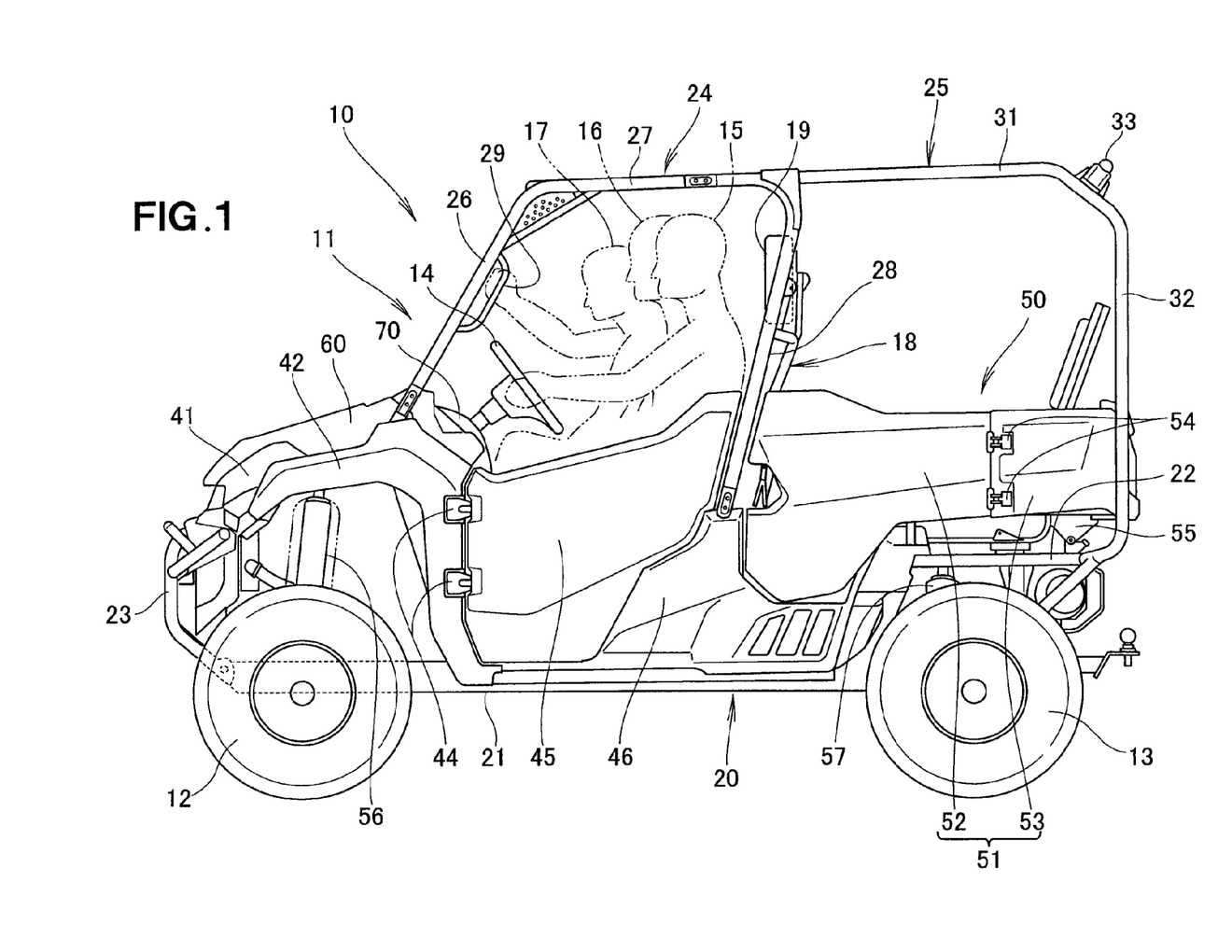
FIG. 1 is a left side elevation view of an all-terrain vehicle according to the present invention.

As shown in FIG. 1, a vehicle 10 is a left-hand drive, all-terrain vehicle having four wheels independently suspended to allow for travelling on irregular terrain. A vehicle body 11 of the vehicle 10 is supported by left and right front wheels 12, 12 and left and right rear wheels 13, 13 provided on a vehicle body frame 20. The left and right front wheels 12, 12 are independently suspended from a front part of the vehicle body frame 20. The left and right rear wheels 13, 13 are independently suspended from a rear part of the vehicle body frame 20. It is noted that the vehicle 10 may be a right-hand drive vehicle. The terms "forwardly", "rearwardly" and "laterally" used herein mean a forward direction of the vehicle, a rearward direction of the vehicle, and a lateral direction of the vehicle. The term "airflow" used herein means a flow of air hitting the vehicle and occupants of the vehicle during traveling of the vehicle.

The vehicle body frame 20 includes a center frame 21 disposed laterally centrally of the vehicle 10 and extending longitudinally of the vehicle 10. The vehicle body frame 20 also includes a rear frame 22 extending rearwardly from a central portion of the center frame 21 and above the center frame 21 in parallel thereto. The vehicle body frame 20 further includes a bumper 23 and front and rear roll bars 24, 25. The bumper 23 is disposed at a distal end of the center frame 21 for protecting a front part of the vehicle 10. The front roll bar 24 is disposed above a front side of the center frame 21. The front roll bar 24 is generally arch-shaped when viewed in side elevation. The rear roll bar 25 extends rearwardly from a rear end of an upper part of the front roll bar 24. The rear roll bar 25 is generally L-shaped when viewed in side elevation.

The vehicle 10 includes a seat 18 disposed between the front wheels 12, 12 and the rear wheels 13, 13 for a driver 15 and passengers 16, 17 to be seated thereon in lateral juxtaposition. The vehicle 10 also includes a headrest 19 disposed on the vehicle body frame 20 for supporting heads of the driver 15 and the passengers 16, 17, and a hood 60 disposed on the vehicle body frame 20 and covering the vehicle body 11. The hood 60 can be opened and closed.

At a front part of the vehicle 10, there is disposed a front cover 41 covering a front end of the vehicle body 11. The front part of the vehicle 10 includes a front fender 42 disposed on a rear part of the front cover 41 and covering a rear side of the front wheel 12 from above, and a front door 45 disposed at a rear part of the front fender 42. The front door 45 can pivot on hinges 44 to be opened and closed.

A rear part of the vehicle 10 includes a side cover 46 disposed at a rear part of the front door 45 and covering a lateral side of the vehicle 10. The rear part of the vehicle 10 also includes a side carrier frame 51 disposed rearwardly of and above the side cover 46. The side carrier frame 51 provides a carrier 50 and has a front part provided by a rear door 52 and a rear part provided by a rear frame 53 mounted on the vehicle body frame 20. The rear door 52 is disposed on a front end of the rear frame 53 in such a manner as to pivot on hinges 54, 54 to be opened and closed.

The carrier 50 is supported by the rear frame 22 through a stay 55. The front wheels 12, 12 are each supported by a front cushion 56. The rear wheels 13, 13 are each supported by a rear cushion 57. Disposed on a rear end of the hood 60 is an instrument panel 70 carrying a variety of meters. Disposed in a vicinity of the instrument panel 70 is a steering wheel 14.

The front roll bar 24 includes a front pillar 26 extending rearwardly and upwardly from an upper part of the front fender 42, an upper bar 27 extending rearwardly from an upper end of the front pillar 26, and a center pillar 28 extending downwardly from a rear part of the upper bar 27. The front pillar 26 carries a grip 29 for the passenger 17 to hold.

The rear roll bar 25 includes a rear roof side rail 31 extending rearwardly from an upper end of the center pillar 28, and a rear pillar 32 extending downwardly from a rear end of the rear roof side rail 31. A rear cross member 33 extends and interconnects rear parts of the left and right rear roof side rails 31.

Figure 2:
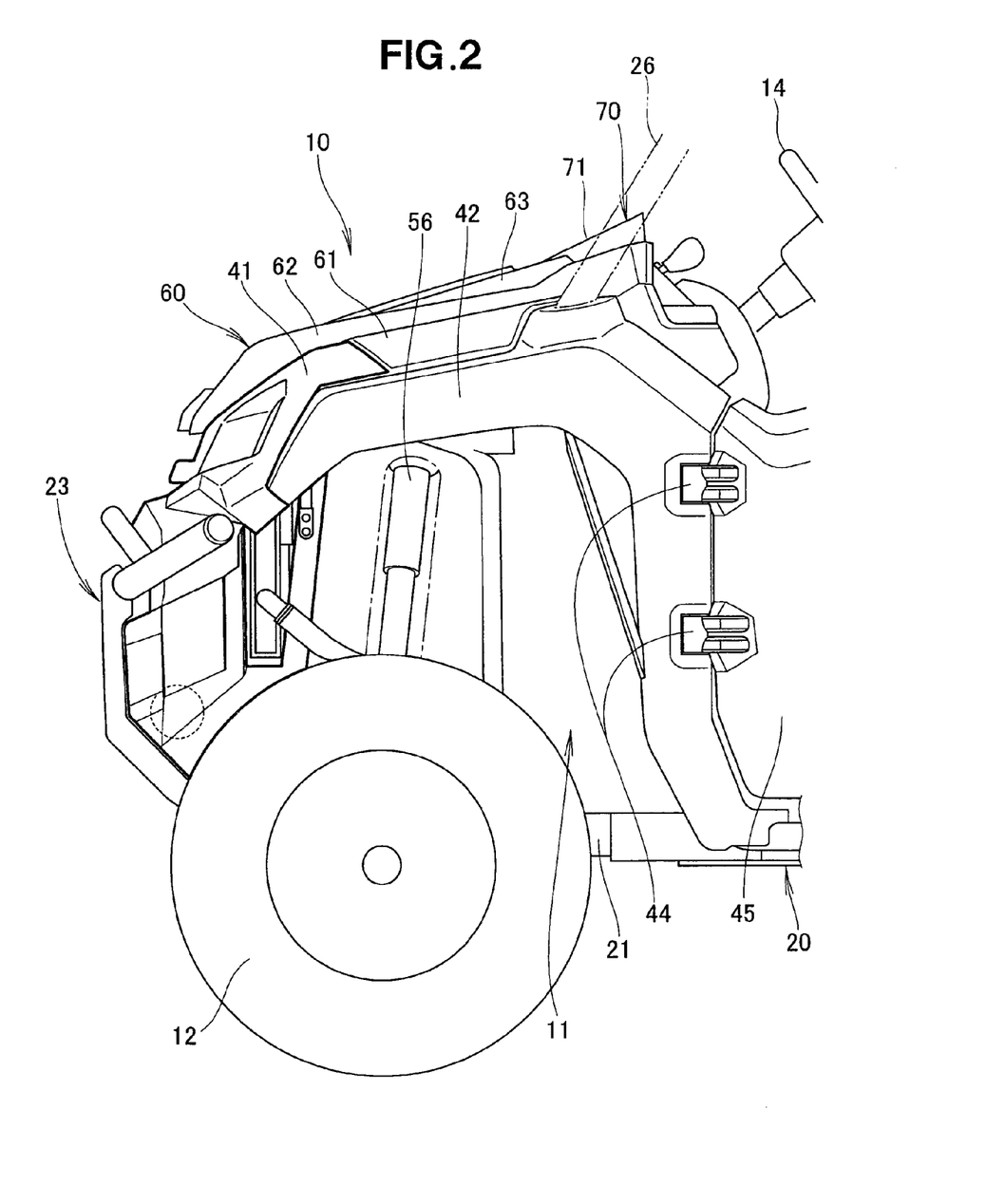
FIG. 2 is an enlarged view of a hood of the all-terrain vehicle of FIG. 1.

As shown in FIG. 2, the hood 60 covers a front part of the vehicle body 11 from above. The hood 60 extends rearwardly and upwardly from the front end of the vehicle body 11. The hood 60 includes upper surfaces 61, 61 at left and right parts thereof, and guide walls 62, 62 protruding upwardly from the upper surfaces 61, 61, and a lid 63 defining a lateral center of the hood 60. The lid 63 is contiguous with upper ends of the guide walls 62, 62. The guide walls 62, 62 continuously extend from a front end of the hood 60 to a rear end of the hood 60. The hood 60 has an increased rigidity due to the left and right guide walls 62 62.

The instrument panel 70 includes an upwardly inclined wall 71 extending rearwardly from the rear end of the hood 60. The inclined wall 71 slants at a larger angle than the hood 60. The inclined wall 71 of the instrument panel 70 has an upper end located higher than an upper end of the hood 60.

Since the inclined wall 71 slants more than the hood 69 and the upper end of the inclined wall 71 is located higher than the upper end of the hood 60, the inclined surface makes an airflow turbulent by changing a direction of the airflow in such a manner as to deviate the airflow upwardly. As a result, an amount of airflow hitting the driver 15 and the passengers 16, 17 (FIG. 1) can be reduced.

Figure 3:
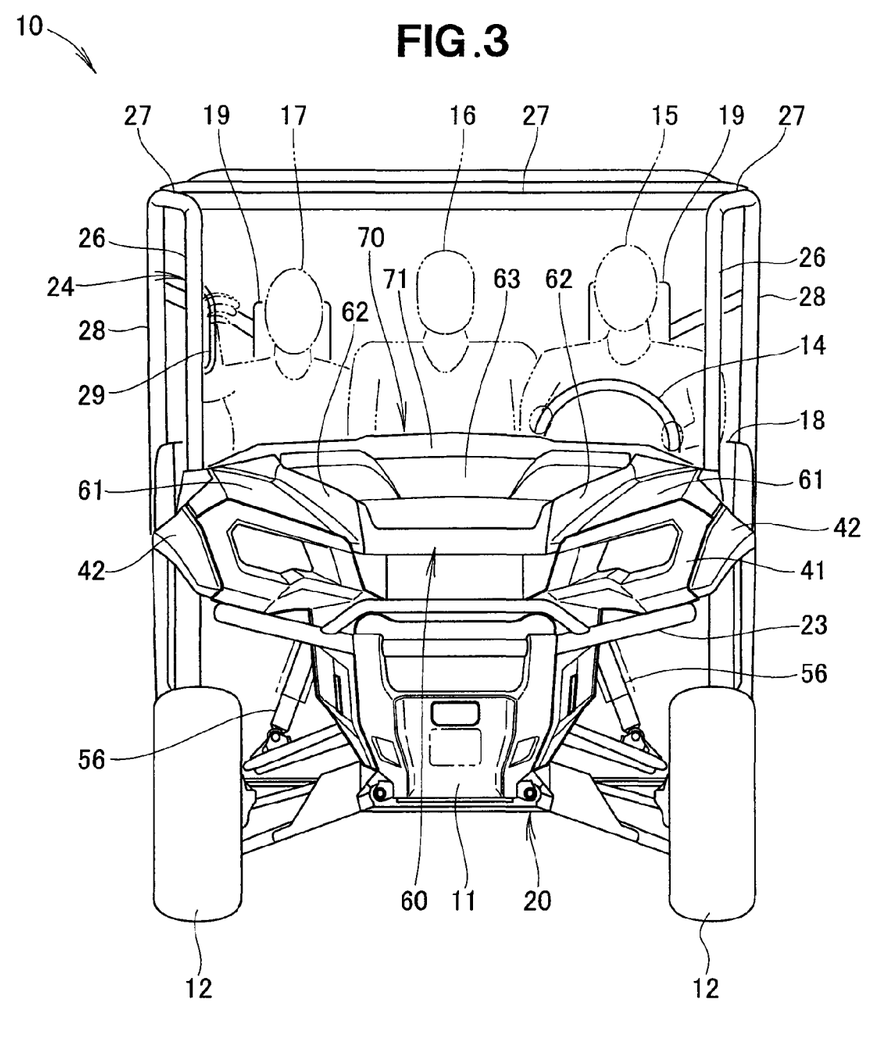
FIG. 3 is a front elevation view of the all-terrain vehicle of FIG. 1.

As shown in FIG. 3, the hood 60 includes the left and right upper surfaces 61, 61, the left and right guide walls 62, 62 rising upwardly from lateral inner ends of the left and right surfaces 61, 61, and the lid 63 extending between and interconnecting the upper ends of the left and right guide walls 62, 62. The left and right guide walls 62, 62 are spaced from each other by a laterally extending interval which becomes large rearwardly. The guide wall 62 has a rear end located on a side of the driver 15 and overlapping the steering wheel 14 laterally of the vehicle 10 when the vehicle 10 is viewed in side elevation, such that an airflow is directed along the guide wall 62 to a vicinity of the steering wheel 14.

The inclined wall 71 of the instrument panel 70 is disposed rearwardly of the rear ends of the left and right guide walls 62, 62 such that the inclined wall 71 can be viewed from the front side of the vehicle 10.

The front roll bar 24 (hereinafter referred to as "roll bar 24") includes a front upper bar 27 extending between and interconnecting the upper ends of the left and right front pillars 26, 26. The upper bar 27 is located above the headrest 19. Since no barrier or obstruction to an airflow is provided between the headrest 19 and the upper bar 27, an airflow having a high velocity can be directed between the headrest 19 and the upper bar 27.

Figure 4:
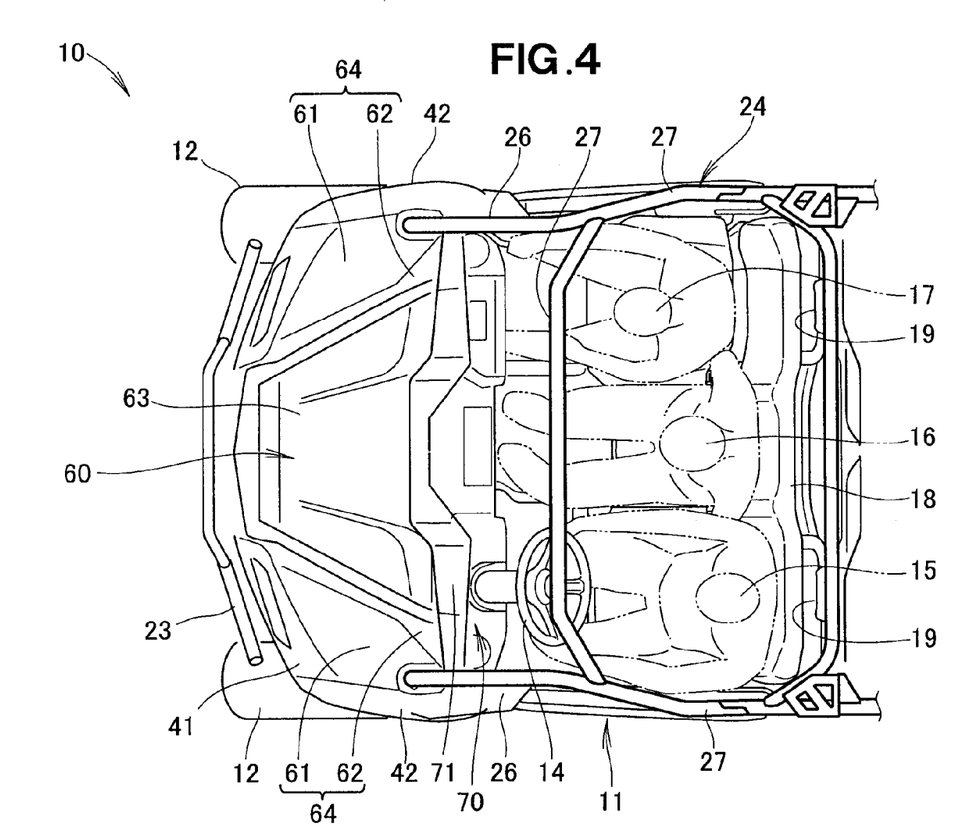
FIG. 4 is a plan view of the all-terrain vehicle of FIG. 1.

As shown in FIG. 4, the left and right guide walls 62, 62 of the hood 60 extend rearwardly from the front end of the vehicle body 11 away from each other. The rear ends of the left and right guide walls 62, 62 are located forwardly of the driver 15 and the right passenger, respectively, so as to direct an airflow laterally of the vehicle body 11 to thereby reduce a velocity of airflow passing along a central part of the vehicle body 11.

The seat 18 can seat three people laterally. The inclined wall 71 of the instrument panel 70 is elongated laterally of the vehicle 10 along the entire front area located forwardly of the driver 15 and the passengers 16, 17.

Figure 5:
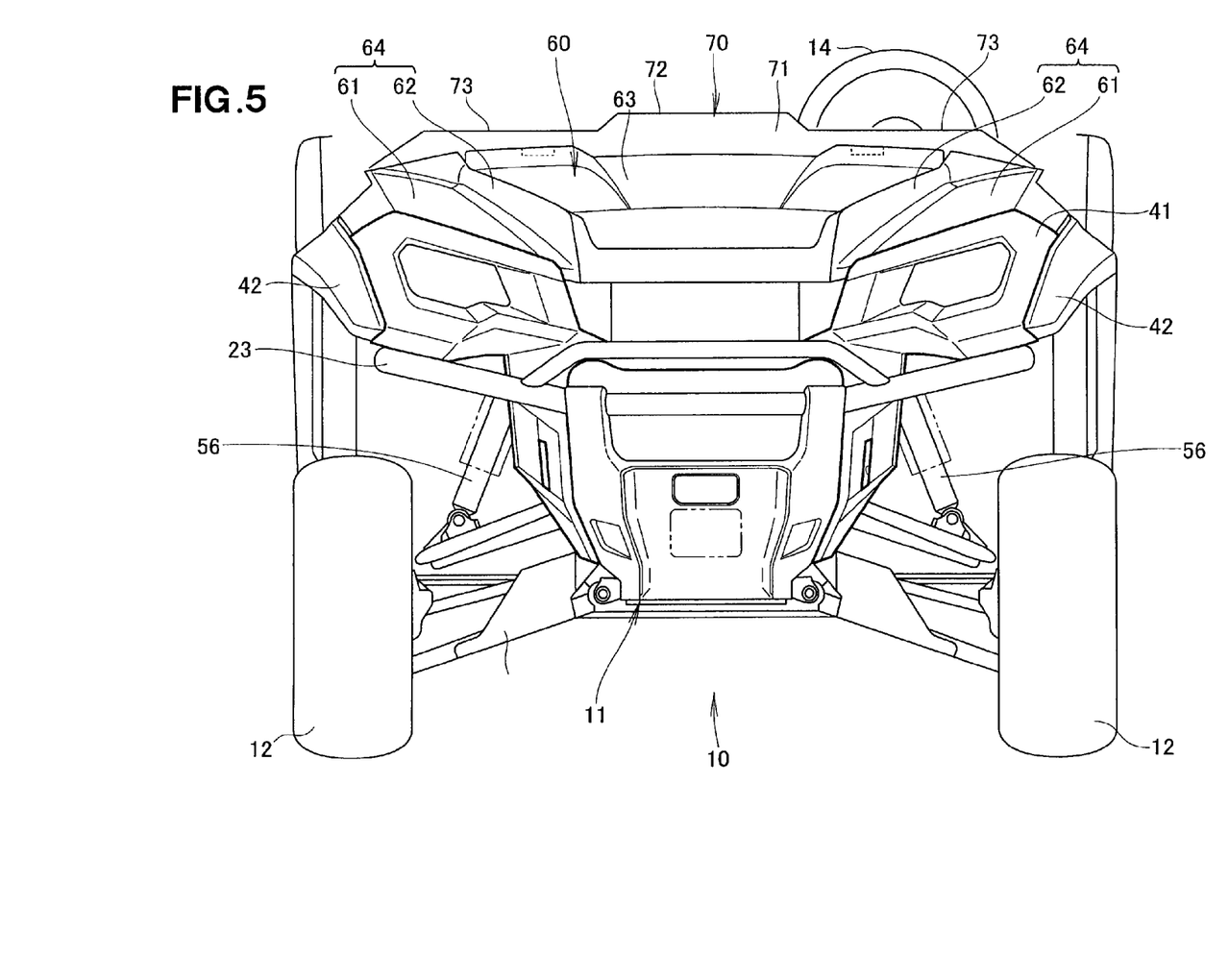
FIG. 5 is an enlarged view of a front part of the all-terrain vehicle of FIG. 1.

As shown in FIG. 5, the instrument panel 70 has an upper edge located higher an upper edge of the hood 60 along the entire width of the vehicle 10. The inclined wall 71 of the instrument panel 70 has an upper edge 72 located at a lateral center thereof, and a lower edge 73 located at lateral opposite ends thereof.

Figure 6:
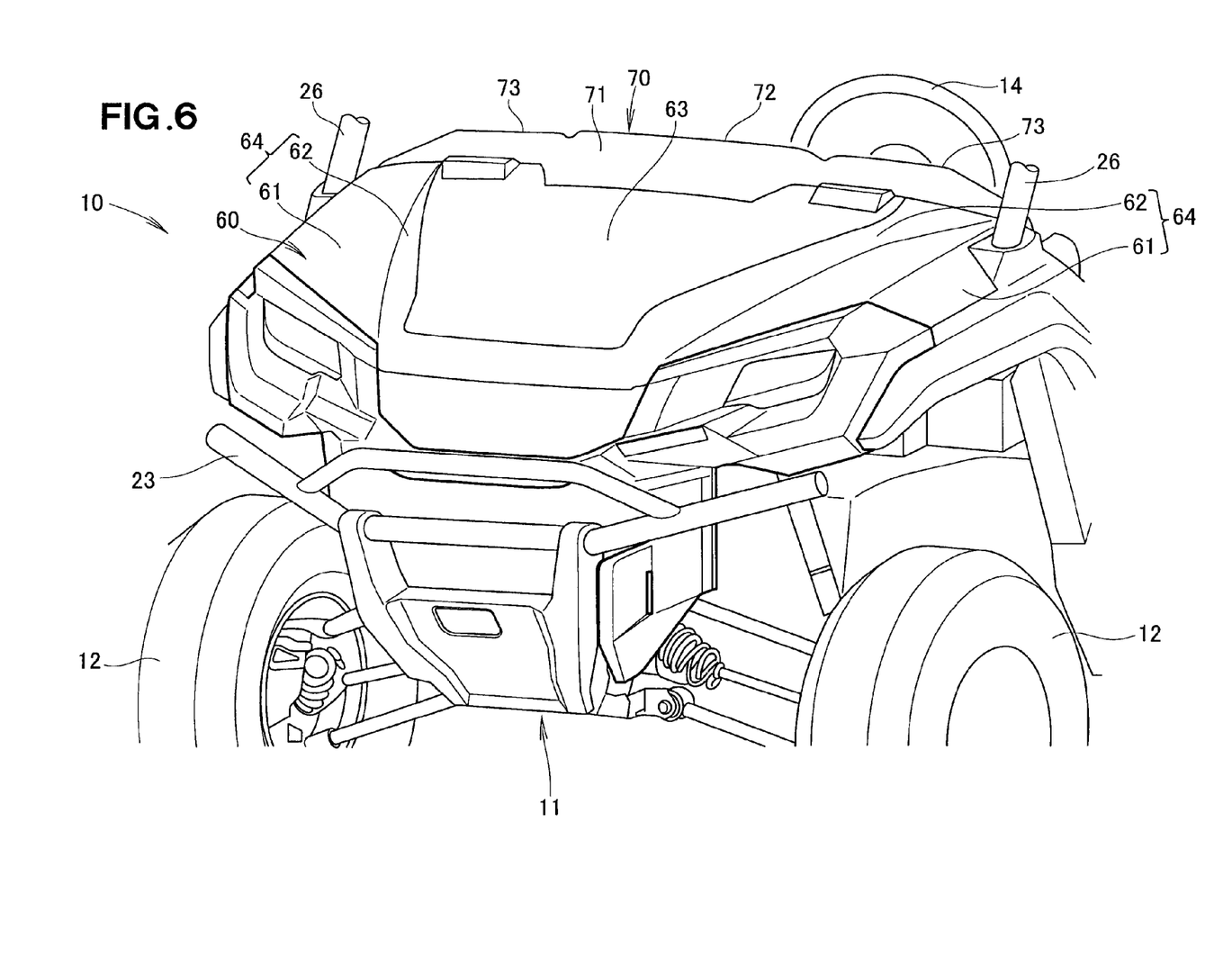
FIG. 6 is a perspective view of the all-terrain vehicle of FIG. 1.

As shown in FIG. 6, the upper surface 61 and the guide wall 62 jointly define a fixed cover 64. The fixed cover 64 is disposed above the front wheel 12 and secured to the vehicle body. The lid 63 is disposed laterally centrally of the vehicle 10 and detachable from the vehicle body. With the lid 63 detached from the vehicle body, first and second batteries and an intake port etc. (not shown) can be viewed from above to allow for maintenance operation.

The left and right guide walls 62, 62 are each disposed at a boundary between the fixed cover 64 and the lid 63 and incorporated in the fixed cover 64. Since the left and right guide walls 62, 62 are part of the fixed covers secured to the vehicle body 11, it becomes possible to reduce vibration or its noise caused by the left and right guide walls 62, 62 as airflows pass along the guide walls 62, 62.

Figure 7:
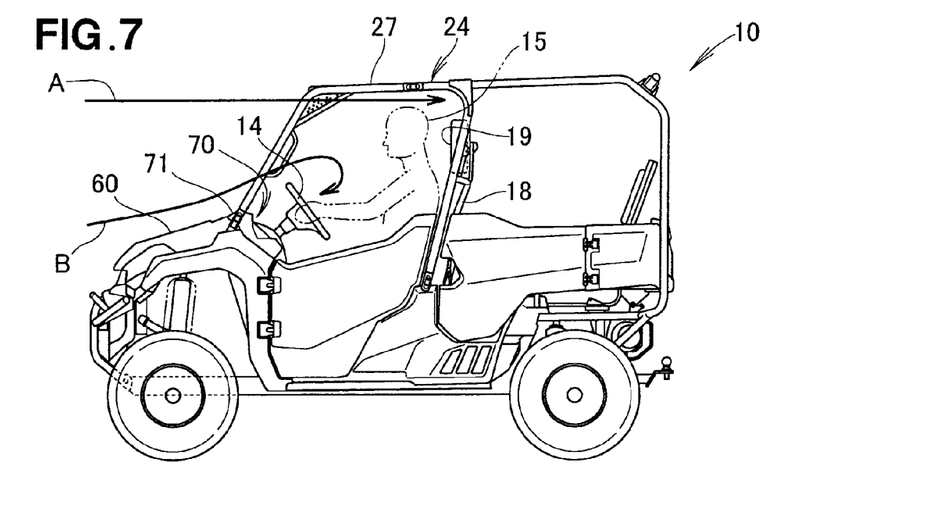
FIG. 7 is a view showing an airflow directed by the all-terrain vehicle as the vehicle is viewed in side elevation.

A discussion is made below as to functions of the all-terrain vehicle described above. As shown in FIG. 7, in the vehicle 10, the headrest 19 is disposed rearwardly of the driver 15 and the upper bar 27 of the roller bar 24 is disposed above the headrest 19. That is, the upper bar 27 is located higher than the head of the driver 15 so as to allow an airflow to smoothly pass through an upper part of the vehicle body keeping a high velocity, as shown in an arrow A.

An airflow which has passed along the hood 60 slows down deviating upwardly due to the inclined wall 71 of the instrument panel 70, after which the airflow turns downwardly, as shown by an arrow B, due to the high velocity of the airflow passing as shown by the arrow A. As a result, in the windshield-less all-terrain vehicle 10, an airflow having passed along the hood 60 does not hit the driver 15 much, such that the driver 15 can feel more comfortable in the vehicle.

Figure 8:
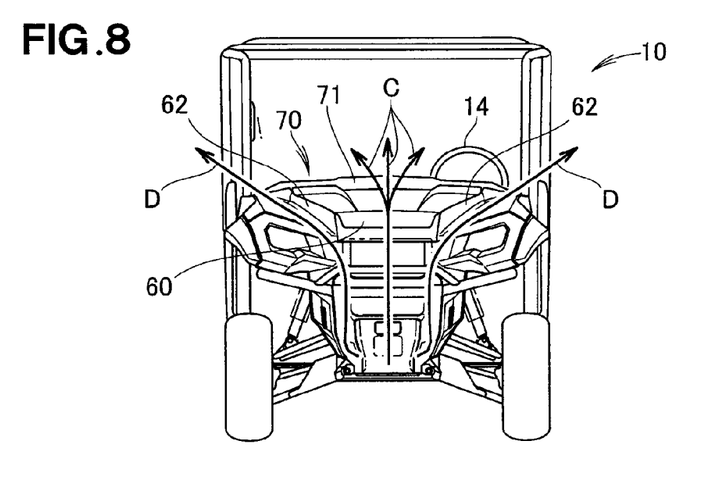
FIG. 8 is a view showing an airflow directed by the all-terrain vehicle as the vehicle is viewed in front elevation.

As shown in FIG. 8, an airflow of high velocity toward a central part of the vehicle is drawn from a narrow front side of the vehicle through the hood 60 between the left and right guide walls 62, 62 and directed rearwardly out of a wide rear area, as shown by arrows C, C, C such that the airflows behind the hood 60 slow down.

When passing on a lateral outside the left and right guide walls 62, 62, airflows are directed outwardly and rearwardly by the left and right guide walls 62, 62, as shown by arrows D, D. The rear end of the guide wall 62 on the driver's side having the steering wheel 14 overlaps the steering wheel 14 laterally of the vehicle when the rear end is viewed in front elevation and the inclined wall 71 is disposed rearwardly of the rear ends of the guide walls 62, 62 such that both the airflows passing between the left and right guide walls 62, 62 as shown by the arrows C, C, C and the airflows passing outside the left and right guide walls 62, 62 as shown by the arrows D, D interact reducing their velocities as they are directed toward the driver located rearwardly of the steering wheel 14. As a result, pressures of the airflows hitting the driver can be reduced to thereby make the driver feel more comfortable in the vehicle.

Figure 9:
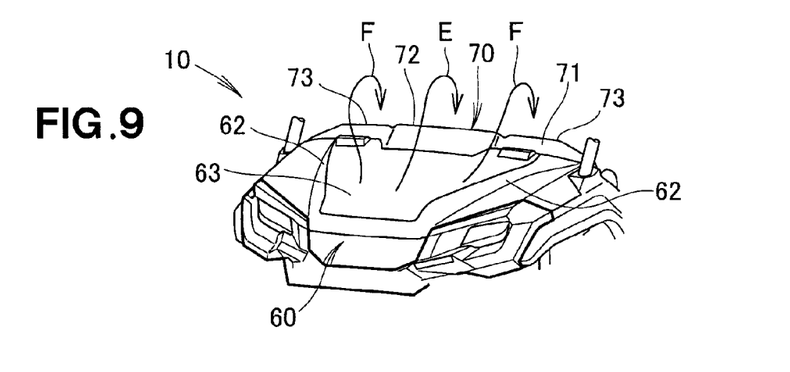
FIG. 9 is a view showing an airflow directed by the all-terrain vehicle as the vehicle is viewed in perspective.

As shown in FIG. 9, the inclined wall 71 has the lateral center located high and the lateral opposite ends located low, such that an airflow passing across the upper edge 72 defined by the lateral center of the instrument panel 70 slows down deviating as shown by an arrow E and airflows passing across the lower edges 73, 73 defined by the lateral opposite ends of the instrument panel 70 move as shown by arrows F, F. That is, no airflow having a high velocity is directed toward a center of the seat 18 (FIG. 4) and a forward visibility of the driver can be improved because left and right sides of the instrument panel 70 are located low.

It is noted that the vehicle 10 may be a right-hand drive vehicle although the vehicle 10 has been described as being the left-hand drive vehicle.

Obviously, various minor changes and modifications of the present invention are possible in light of the above teaching. It is therefore to be understood that within the scope of the appended claims the invention may be practiced otherwise than as specifically described.

What is claimed is:

1. An all-terrain vehicle including a vehicle body frame, left and right front wheels and left and right rear wheels disposed on the vehicle body frame and supporting a vehicle body, a seat disposed between the left and right front wheels and the left and right rear wheels for seating a driver and passengers in lateral juxtaposition, a roll bar extending forwardly of and above the seat, and a hood disposed above the left and right front wheels and forwardly of the seat and covering the vehicle body, wherein the vehicle body includes an instrument panel disposed on a rear end of the hood for supporting meters, wherein the instrument panel includes an upwardly inclined wall extending rearwardly from the rear end of the hood, wherein the hood includes left and right guide walls protruding upwardly from upper surfaces thereof, the left and right guide walls extending continuously formed from a front end of the hood to a rear end of the hood, wherein one of the guide walls has a rear end located on a side of the driver, the rear end of the one guide wall overlapping a steering wheel in a lateral direction of the vehicle when the rear end of the one guide wall is viewed in front elevation, and wherein the inclined wall is disposed rearwardly of the rear end of the guide walls, and wherein the hood includes fixed covers disposed above the left and right front wheels, and a lid disposed centrally of the vehicle, the lid being detachable from the vehicle body, the left and right guide walls being each disposed at a boundary between the lid and each of the fixed covers and incorporated in each of the fixed cover.

2. The vehicle of claim 1, wherein the vehicle body includes a headrest disposed rearwardly of the driver, and wherein the roll bar includes an upper bar disposed above the headrest.

3. An all-terrain vehicle including a vehicle body frame, left and right front wheels and left and right rear wheels disposed on the vehicle body frame and supporting a vehicle body, a seat disposed between the left and right front wheels and the left and right rear wheels for seating a driver and passengers in lateral juxtaposition, a roll bar extending forwardly of and above the seat, and a hood disposed above the left and right front wheels and forwardly of the seat and covering the vehicle body, wherein the vehicle body includes an instrument panel disposed on a rear end of the hood for supporting meters, wherein the instrument panel includes an upwardly inclined wall extending rearwardly from the rear end of the hood, wherein the hood includes left and right guide walls protruding upwardly from upper surfaces thereof, the left and right guide walls extending continuously formed from a front end of the hood to a rear end of the hood, wherein one of the guide walls has a rear end located on a side of the driver, the rear end of the one guide wall overlapping a steering wheel in a lateral direction of the vehicle when the rear end of the one guide wall is viewed in front elevation, and wherein the inclined wall is disposed rearwardly of the rear end of the guide walls, wherein the left and right guide walls are spaced from each other by an interval extending laterally of the vehicle, the interval increasing rearwardly of the vehicle, and wherein the hood includes fixed covers disposed above the left and right front wheels, and a lid disposed centrally of the vehicle, the lid being detachable from the vehicle body, the left and right guide walls being each disposed at a boundary between the lid and each of the fixed covers and incorporated in each of the fixed covers.

4. The vehicle of claim 3, wherein the vehicle body includes a headrest disposed rearwardly of the driver, and wherein the roll bar includes an upper bar disposed above the headrest.

5. An all-terrain vehicle including a vehicle body frame, left and right front wheels and left and right rear wheels disposed on the vehicle body frame and supporting a vehicle body, a seat disposed between the left and right front wheels and the left and right rear wheels for seating a driver and passengers in lateral juxtaposition, a roll bar extending forwardly of and above the seat, and a hood disposed above the left and right front wheels and forwardly of the seat and covering the vehicle body, wherein the seat being adapted to seat three people laterally of the vehicle in juxtaposition, wherein the vehicle body includes an instrument panel disposed on a rear end of the hood for supporting meters, wherein the instrument panel includes an upwardly inclined wall extending rearwardly from the rear end of the hood, wherein the inclined wall having a lateral center and lateral opposite ends located lower than the lateral center, wherein the hood includes left and right guide walls protruding upwardly from upper surfaces thereof, wherein the left and right guide walls are spaced from each other by an interval extending laterally of the vehicle, the interval increasing rearwardly of the vehicle, and wherein the hood includes fixed covers disposed above the left and right front wheels, and a lid disposed centrally of the vehicle, the lid being detachable from the vehicle body, the left and right guide walls being each disposed at a boundary between the lid and each of the fixed covers and incorporated in each of the fixed covers.

6. The vehicle of claim 5, wherein the vehicle body includes a headrest disposed rearwardly of the driver, and wherein the roll bar includes an upper bar disposed above the headrest.

* * * * *